(12) United States Patent
Kim et al.

(10) Patent No.: US 7,670,467 B2
(45) Date of Patent: Mar. 2, 2010

(54) METAL OXIDE SUPERCAPACITOR HAVING METAL OXIDE ELECTRODE COATED ONTO TITANIUM DIOXIDE ULTRAFINE FIBER AND METHOD FOR PREPARING THE SAME

(75) Inventors: Dong-Young Kim, Seoul (KR); Seong-Mu Jo, Seoul (KR); Byung-Doo Chin, Gyeonggi-Do (KR); Young-Rack Ahn, Seoul (KR)

(73) Assignee: Korea Institute of Science and Technology (KR)

( * ) Notice: Subject to any disclaimer, the term of this patent is extended or adjusted under 35 U.S.C. 154(b) by 663 days.

(21) Appl. No.: 11/556,007

(22) Filed: Nov. 2, 2006

(65) Prior Publication Data
US 2007/0095657 A1 May 3, 2007

(30) Foreign Application Priority Data
Nov. 2, 2005 (KR) .................... 10-2005-0104586

(51) Int. Cl.
*C25B 11/04* (2006.01)
*C25B 11/06* (2006.01)
*C25B 11/08* (2006.01)
*C25B 11/10* (2006.01)

(52) U.S. Cl. .............. 204/291; 361/502; 361/528; 361/532; 427/190; 427/126.3; 427/126.5; 427/126.6; 205/150; 205/170; 205/333

(58) Field of Classification Search ............ 204/291; 361/502, 528, 532; 427/190, 126.3, 126.5, 427/126.6; 205/150, 170, 333
See application file for complete search history.

(56) References Cited

U.S. PATENT DOCUMENTS

| 5,521,029 A * | 5/1996 | Fiorino et al. ............... 205/150 |
| 7,438,949 B2 * | 10/2008 | Weidman ................... 427/250 |
| 2003/0161784 A1 * | 8/2003 | Okusako et al. ............. 423/608 |
| 2007/0070581 A1 * | 3/2007 | Yoshida et al. ............. 361/502 |
| 2007/0261959 A1 * | 11/2007 | Kim et al. ................... 204/424 |

* cited by examiner

*Primary Examiner*—Bruce F Bell
(74) *Attorney, Agent, or Firm*—Ostrolenk Faber LLP

(57) ABSTRACT

A supercapacitor having a metal oxide electrode and a method for preparing the same. The method comprises preparing a substrate composed of a current collector and a titanium dioxide ultrafine fiber matrix layer formed on the current collector, and electrochemically depositing a metal oxide thin film layer onto the substrate by a constant current potentiometry or a cyclic voltammetric method. Since the metal oxide is uniformly deposited on the substrate having a wide specific surface area with the titanium dioxide ultrafine fiber, a bonding material or a conductive particle need not to be added to the capacitor electrode. Therefore, a resistance of the capacitor electrode is prevented from being increased, and thus a capacitance of the capacitor electrode is prevented from being decreased.

9 Claims, 6 Drawing Sheets

METAL OXIDE SUPERCAPACITOR HAVING METAL OXIDE ELECTRODE COATED ONTO TITANIUM DIOXIDE ULTRAFINE FIBER AND METHOD FOR PREPARING THE SAME

BACKGROUND OF THE INVENTION

1. Field of the Invention

The present invention relates to a supercapacitor and a method for preparing the same, and more particularly, to a supercapacitor having a metal oxide electrode coated onto titanium dioxide ultrafine fiber and a method for preparing the same.

2. Description of the Background Art

Generally, a super capacitor is largely divided into an active carbon-based capacitor, a metal oxide-based electrochemical pseudo capacitor, and an oxidizable/deoxidizable conductive high polymer-based capacitor according to an electrode material.

The active carbon-based capacitor is based on the principle that ions of an electrolyte solution form an electric double layer capacitor (EDLC) on a surface of an electrode and are physically absorbed/detached to/from the EDLC. In the active carbon-based capacitor, carbon is chemically stable, and thus, the lifespan of the active carbon-based capacitor is excellent. However, since charges are accumulated only on the EDLC of the electrode surface, capacitance of the active carbon-based capacitor is lower than that of a supercapacitor using the Faraday reaction.

The metal oxide-based pseudo capacitor is a supercapacitor using a metal oxide as an electrode active material. The electrode active material of the metal oxide-based pseudo capacitor requires a high conductivity. When the metal oxide-based pseudo capacitor has a low conductivity, an equivalent series resistance (ESR) thereof is increased and thus the output efficiency thereof is lowered. When the substantial utilization degree of the active material is lowered, the energy density is lowered. That is, an electrode formed of the particle active materials has an increased resistance between the particles, which reduces function, resulting in a low power density per unit weight. A carbon material may be mixed to the metal oxide capacitor in order to increase a conductivity. The carbon material h as to be serially connected to t he active material of the electrode at a current collector inside the electrode in order to obtain an excellent efficiency. Accordingly, degree of dispersion of the carbon material and a mixing method between the active material and the carbon are very important. Substantially, it is difficult to maintain an excellent degree of dispersion of the carbon material.

In a conventional metal oxide capacitor, an electrode is fabricated by coating a metal oxide with a conductive high polymer. Also, an electric double layer capacitor (EDLC) using a carbon fiber has been proposed, in which a mechanical intensity of the electrode is high, several small capacitors can be fabricated, capacitance per unit volume is high, and current leakage is relatively low.

A supercapacitor using ruthenium oxide has a current accumulation mechanism in which protons move while metal oxides are oxidized or deoxidized by the Faraday reaction. Therefore, the supercapacitor using ruthenium oxide has a higher capacitance than the EDLC using carbon. However, the ruthenium oxide is several hundred times more expensive than a general active material. Therefore, it is difficult to utilize the ruthenium oxide as an electrode active material. In order to solve the problem, a technique for fabricating an electrode using a minimum amount of ruthenium oxide is required.

Ruthenium oxides used in the conventional supercapacitor are provided in a sol-gel state and have a weak bonding force between particles. Thus, in order to apply ruthenium oxide to an electrode, a bonding material, which increases an electrode resistance and thus decreases capacitance of the capacitor, is required. In order to solve this problem, a method for fabricating an electrode by immersing a titanium dioxide-based substrate or a carbon-based substrate into ruthenium chloride solution or ruthenium oxide solution and then thermally processing the substrate has been in research. However, this method has a disadvantage in that a wide specific surface area of the substrate cannot be utilized since the ruthenium oxides are not evenly distributed on the substrate.

In order to achieve metal oxide supercapacitor having a high capacitance, the contact resistance between active materials has to be increased and the surface area of expensive metal oxides has to be increased such that a minimum amount of the metal oxides is required.

BRIEF DESCRIPTION OF THE INVENTION

Therefore, an object of the present invention is to provide a capacitor electrode in which a metal oxide having a high capacitance is evenly deposited on the surface of a current collector as a thin film, and a supercapacitor having the same.

To achieve these and other advantages and in accordance with the purpose of the present invention, as embodied and broadly described herein, an electrode for a supercapacitor and a supercapacitor having the same, the electrode for a supercapacitor fabricated by preparing a substrate composed of a current collector and a porous titanium dioxide ultrafine fiber matrix layer having a large specific surface area and formed on the current collector, and electrochemically depositing a metal oxide thin film layer onto the substrate by a constant current potentiometry or a cyclic voltammetric method are provided.

The ultrafine titanium oxide fiber layer may have a diameter of 50 nm to 1000 nm. Still further, the ultrafine titanium oxide fiber layer preferably has a diameter of 1 nm to 50 nm and a length to 10 nm to 200 nm. The capacitor electrode also may have a current collector selected from the group including a metal plate, metal mesh and metal foam.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

In the present invention, metal oxide active materials are deposited on the surface of ultrafine fiber on a substrate such that they are connected to each other in series, thereby minimizing the interface contact resistance generated on a particle active material electrode. Additionally, in the case of using an expensive metal oxide, a wide surface area can be obtained so that a capacitor having a high capacitance with the use of a minimum amount of the metal oxides can be prepared.

In the present invention, a substrate formed of porous titanium dioxide ultrafine fibers that has a wide specific surface area is prepared by forming a precursor ultrafine fiber matrix layer on a current collector by electro-spinning a mixture solution between a high polymer solution and a titanium oxide precursor, and then by sintering the matrix layer. A high polymer used to prepare the substrate is not limited to a specific material. When using a high polymer, such as polyvinylacetate, polyvinylpyrrolidone, etc., which is sintered at a certain temperature to become volatile, only titanium dioxide ultrafine fiber is obtained. However, when a high polymer that leaves carbon, such as polyacrylonitrile, polyvinylidenefluoride, polyimide, is used, ultrafine fibers mixed with carbon and titanium oxide are formed on the current collector even after they are sintered.

It is also possible to mix a carbon particle, metal powder, etc. to a mixture solution between a high polymer solution used to prepare a substrate of titanium dioxide ultrafine fiber and a titanium oxide precursor. In this case, when the substrate of titanium dioxide ultrafine fiber has been sintered, carbon particles or metal powder with a high conductivity is obtained. Therefore, a titanium dioxide ultrafine fiber matrix having a high conductivity can be prepared. Any fine particle having a size that is enough not to block a nozzle can be used as the metal powder. However, it is preferable that the nano particles are used for electrospinning of a precursor solution.

Figure 1:
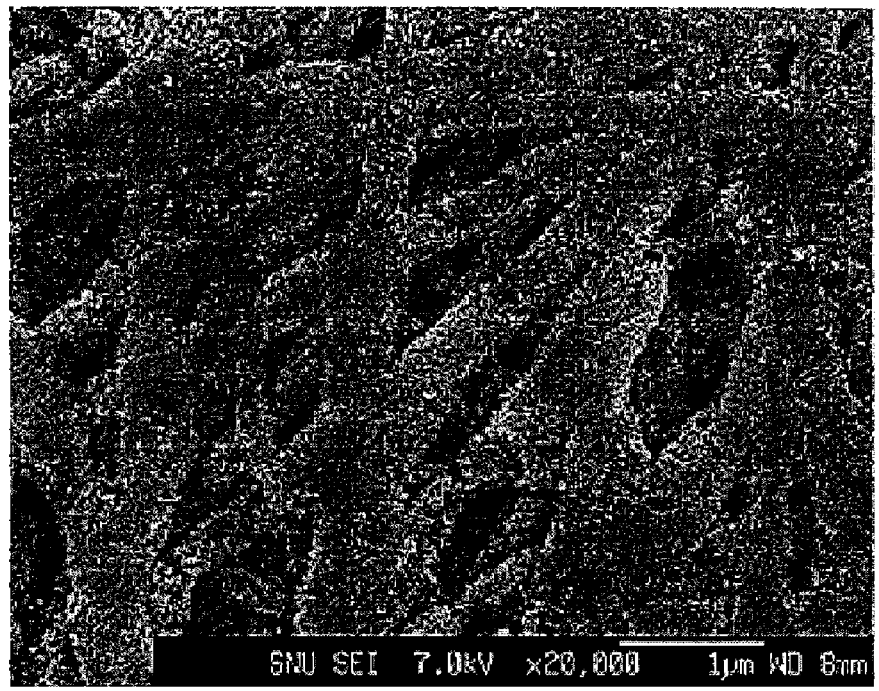
FIG. 1 is a photograph of a scanning electron microscope (SEM) of a titanium oxide nano fiber formed of a titanium oxide nano rod.

To have pore control, control of the thickness of the matrix layer, and fine structure, the titanium dioxide ultrafine fiber matrix formed on the current collector can be compressed with a certain pressure before being sintered. In this case, a nano fibril fine structure formed in the ultrafine fiber is exposed after sintering process, thereby obtaining a titanium oxide matrix formed of nano rods of titanium oxides and having a wide surface area as shown in FIG. 1.

A metal oxide thin film for a supercapacitor can be formed on the titanium dioxide ultrafine fiber matrix by an electrochemical deposition method using a precursor solution. The titanium dioxide ultrafine fiber matrix substrate is immersed in a metal oxide precursor solution and then a constant current potentiometry or a cyclic voltammetric method is applied to the solution, thereby obtaining a metal oxide. The deposited metal oxide can be a metal oxide such as ruthenium oxide, rubidium oxide, iridium oxide, nickel oxide, cobalt oxide, manganese oxide, vanadium oxide, etc., or can be a mixture thereof.

For instance, a ruthenium oxide thin film is formed on the titanium dioxide ultrafine fiber substrate by immersing the titanium dioxide ultrafine fiber substrate into ruthenium oxide precursor solution prepared as trichlororuthenium hydrate is dissolved in deionized water with a concentration of 0.005~0.1 mol and then by depositing the substrate at a temperature of 30° C.~70° C. An electrolyte such as calcium chloride or hydrogen chloride can be added to the solution. The deposited electrode is heat treated at a high temperature, preferably, for 30 minutes to 2 hours at a temperature of 150° C.~200° C.

For the deposition by a constant current potentiometry, a substrate to be deposited is served as a cathode, a platinum is served as an anode, and a constant current is applied thereto. Preferably, a current corresponding to 0.5 mA/cm$^2$~10 mA/cm$^2$ is applied. The larger the current density is, the faster the deposition speed of the ruthenium oxide. Therefore, a low current is applied in order to increase a density of the ruthenium oxide.

Figure 5:
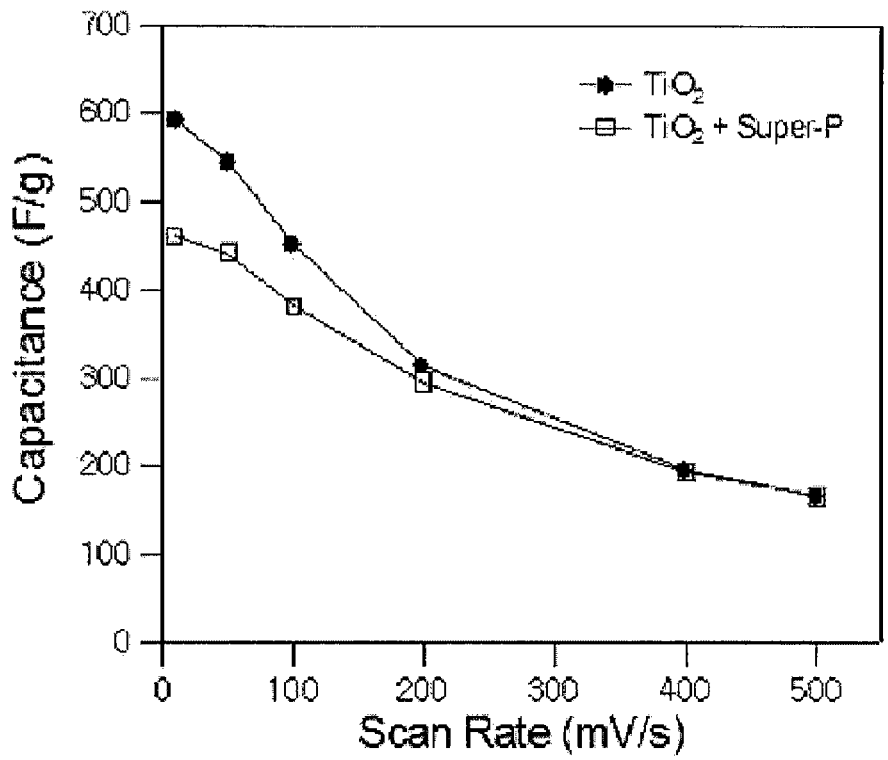
FIG. 5 shows a specific capacitance measured according to each scanning rate of a preferred embodiment of the present invention.

For the deposition by a cyclic voltammetric method, three electrodes are used. That is, a substrate to be deposited is served as an operation electrode, a platinum is served as a relative electrode, and an Ag/AgCl electrode or a saturated calomel elect rode is served as a reference electrode . A scanning rate is set to be 10~500 mV per second, and the amount of the ruthenium oxide can be controlled by the number of times that a current is circulated. As shown in FIG. 5, capacitance difference is greatly generated according to a scanning rate at the time of the deposition operation. It is effective to deposit the Ag/AgCl reference electrode with a voltage of 0.25~1.45.

The present invention is performed by, but not limited to, the following preferred embodiments.

Preferred Embodiment 1

Ultrafine titanium oxide fibers prepared by electro-spinning a precursor solution on a current collector of a titanium metal plate and then sintering the solution has been used as a substrate. The substrate has an area of 1 cm×1 cm. 1.037 g of trichlororuthenium and 0.745 g of potassium chloride were dissolved in deionized water, thereby obtaining 100 ml of solution. The solution was maintained at 50° C. under a constant magnetic stirring, and the titanium oxide substrate was immersed into the solution for 20 minutes. Then, 5 mA of current was applied to the solution to deposit ruthenium oxides. Next, the ruthenium oxide was washed using deionized water. A weight difference between an electrode prior to deposition and an electrode after the deposition was used as the weight of the ruthenium oxide. A cyclic voltammetric graph was obtained from 0.5 m of aqueous solution sulfate. In the cyclic voltammetric graph, an average current was obtained and the average current is divided by a scanning rate thereby obtaining capacitance. The capacitance was divided by the weight of the ruthenium oxide, thereby obtaining a specific capacitance.

FIG. 1 shows a scanning electron microscope (SEM) photograph of titanium oxide that ruthenium oxide has not been deposited, in which electrospinned ultrafine titanium oxide fiber is formed of a bundle of fine fiber having a thickness of 10~30 nm.

Figure 2:
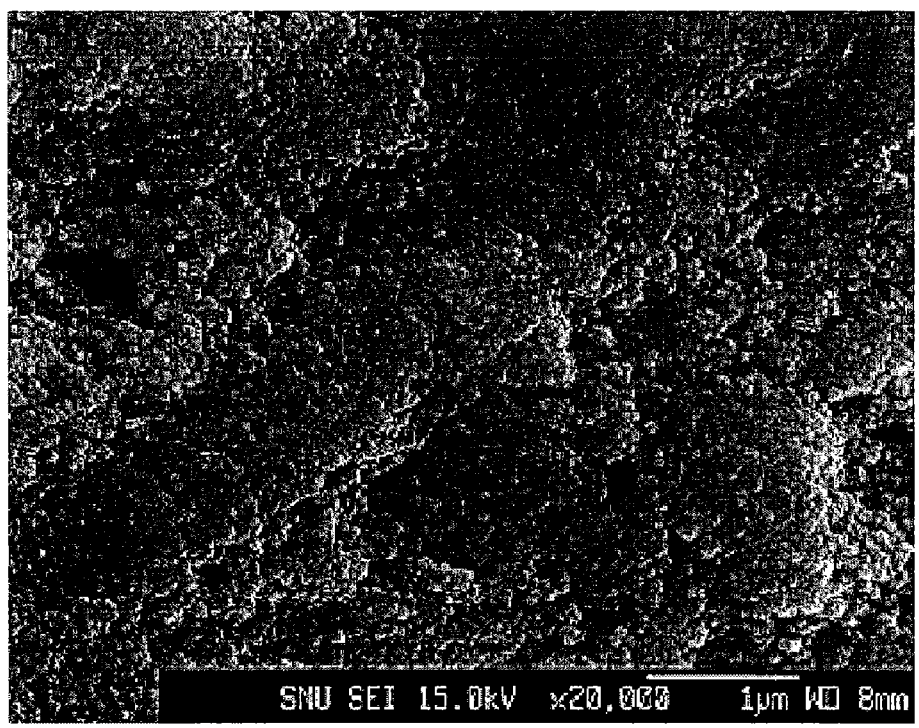
FIGS. 2 and 3 are SEM photographs of ruthenium oxide electrode deposited by a constant current potentiometry according to a preferred embodiment of the present invention.
Figure 3:
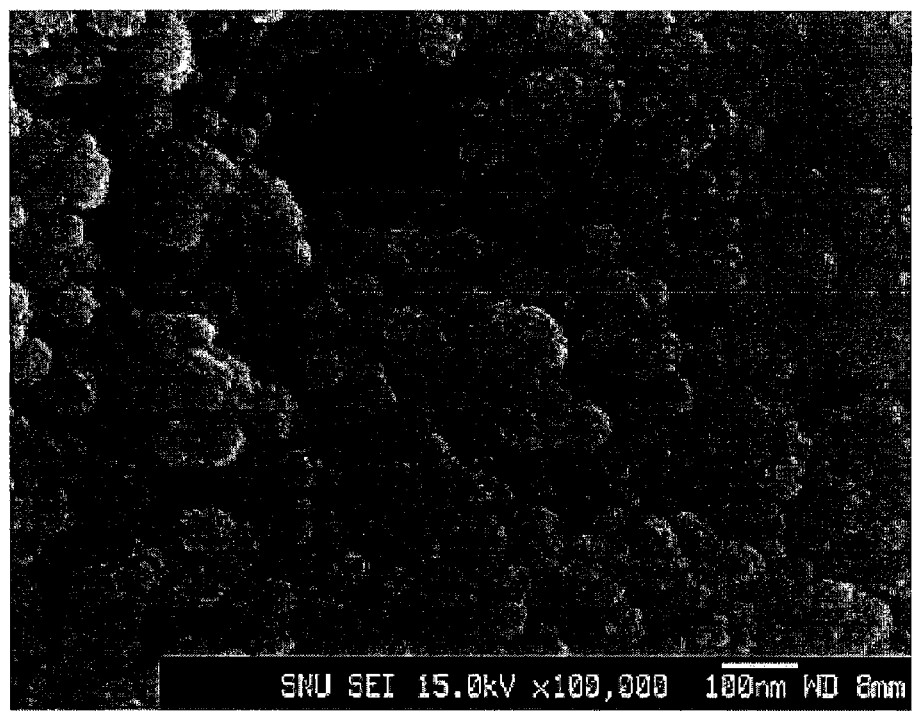

FIGS. 2 and 3 show SEM photographs of an electrode formed by depositing a ruthenium oxide with a constant current potentiometry. A current of 5 mA/cm$^2$ was applied to 0.05 mmol of ruthenium chloride aqueous solution to perform deposition for 30 minutes. As shown in FIG. 3, the ruthenium oxide completely covers fine fiber of the titanium oxide. However, as shown in FIG. 2, the formation of the titanium oxide fiber remains as it is.

Figure 4:
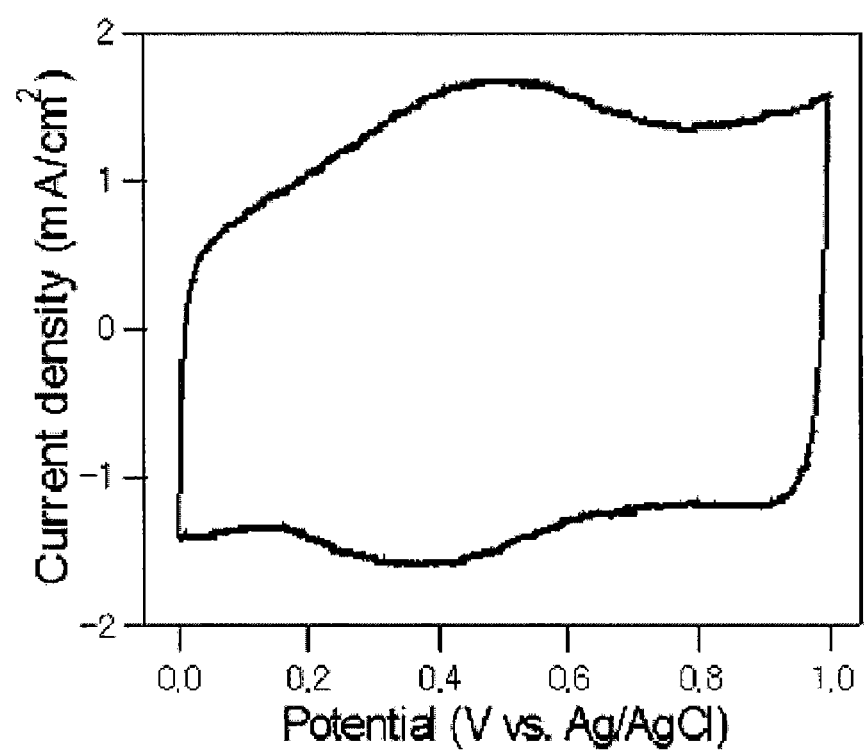
FIG. 4 is a test result showing current density by a scanning rate of 10 mV/sec in a potential range of 0~1V (saturated Ag/AgCl electrode) by a cyclic voltammetric method according to Comparison 1 of the present invention.

FIG. 4 shows a test result obtained by circulating a saturated Ag/AgCl electrode of a potential range of 0~1V in 0.5 mmol of aqueous solution sulfate with a spinning rate of 10 mV/sec by a cyclic voltammetric method. As shown in FIG. 4, 592 F/g of a specific capacitance was obtained. FIG. 5 shows a specific capacitance measured according to each scanning rate.

Comparison Example 1

The same process as described in the aforementioned preferred embodiment 1 was performed except that ultrafine titanium oxide fiber was electrospinned onto a transparent electrode, instead of a current collector formed of a titanium metal plate, was used as a substrate (*Nanotechnology*, 15, 1861 (2004)).

Figure 6:
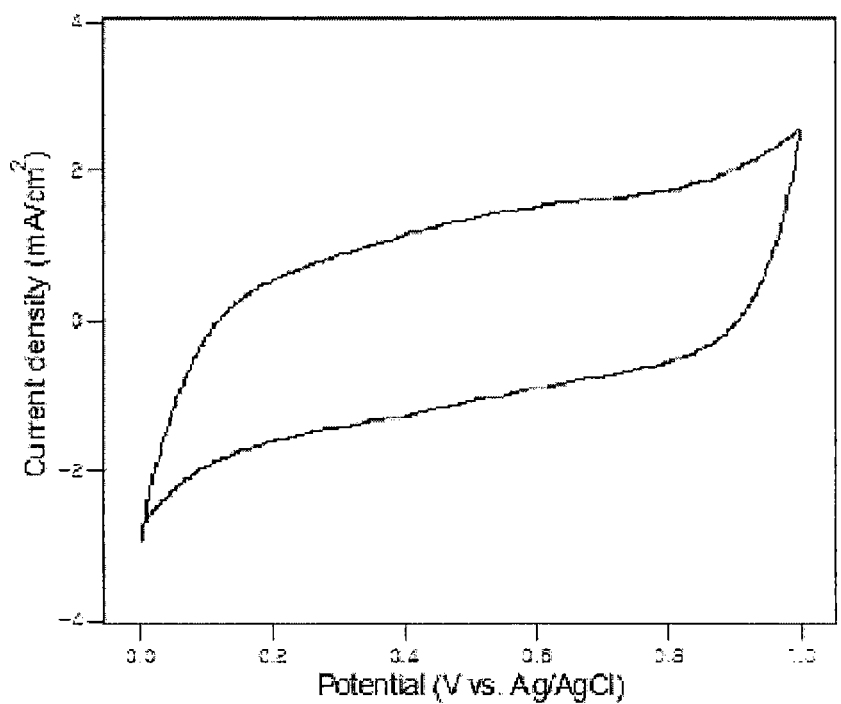
FIG. 6 shows a cyclic voltammetric of ruthenium oxide electrode deposited by a constant current potentiometry according to a preferred embodiment of the present invention.
Figure 7:
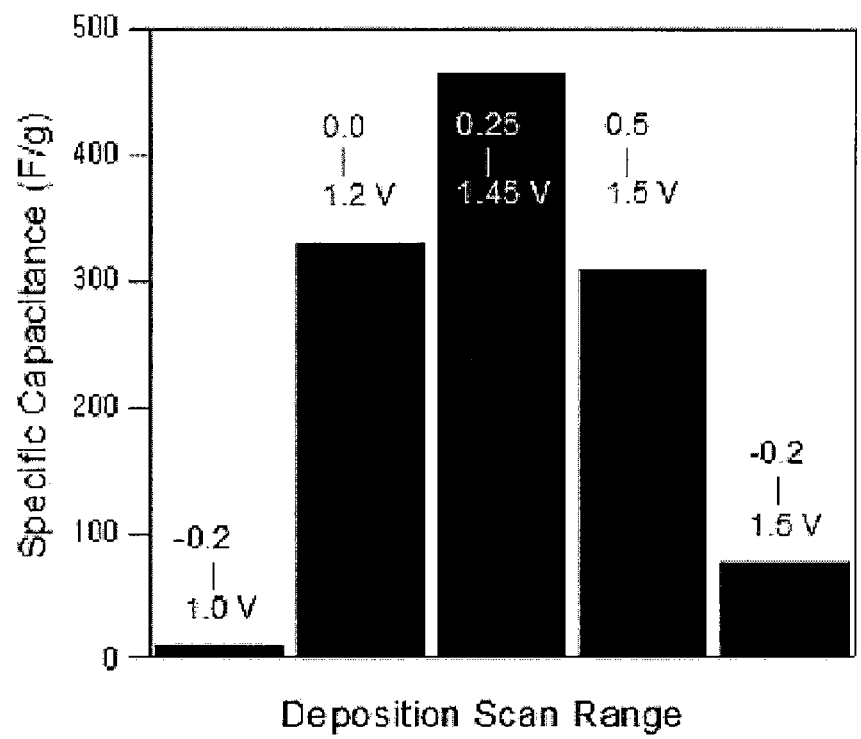
FIG. 7 shows a capacitance of ruthenium oxide electrode deposited by a cyclic voltammetric method according to a scanning potential range according to a preferred embodiment of the present invention.

FIG. 6 shows a test result obtained by circulating a saturated Ag/AgCl electrode of a potential of 0~1V in 0.5 mmol of aqueous solution sulfate with a spinning rate of 10 mV/sec by a cyclic voltammetric method. As shown in FIG. 6, 151 F/g of a specific capacitance was obtained. FIG. 7 shows a specific capacitance measured according to each scanning rate.

Preferred Embodiment 2

Figure 8:
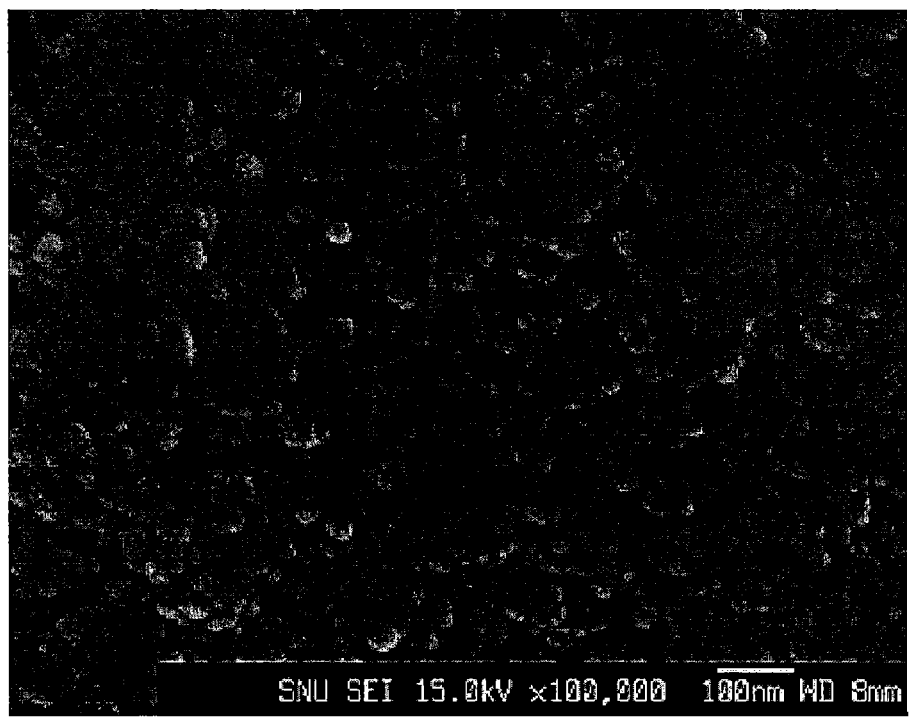
FIG. 8 is a SEM photograph of ruthenium oxide electrode deposited by a cyclic voltammetric method according to a preferred embodiment of the present invention.

FIG. 8 shows a SEM photograph of an electrode in which an ultrafine titanium oxide fiber substrate (1 cm×1 cm) is deposited in 0.05 mmol of ruthenium chloride aqueous solution by a cyclic voltammetric method. Referring to FIG. 8, a period of 0.25~1.45 V of a saturated Ag/AgCl electrode was circulated 600 times with a spinning rate of 300 mV/sec.

Figure 9:
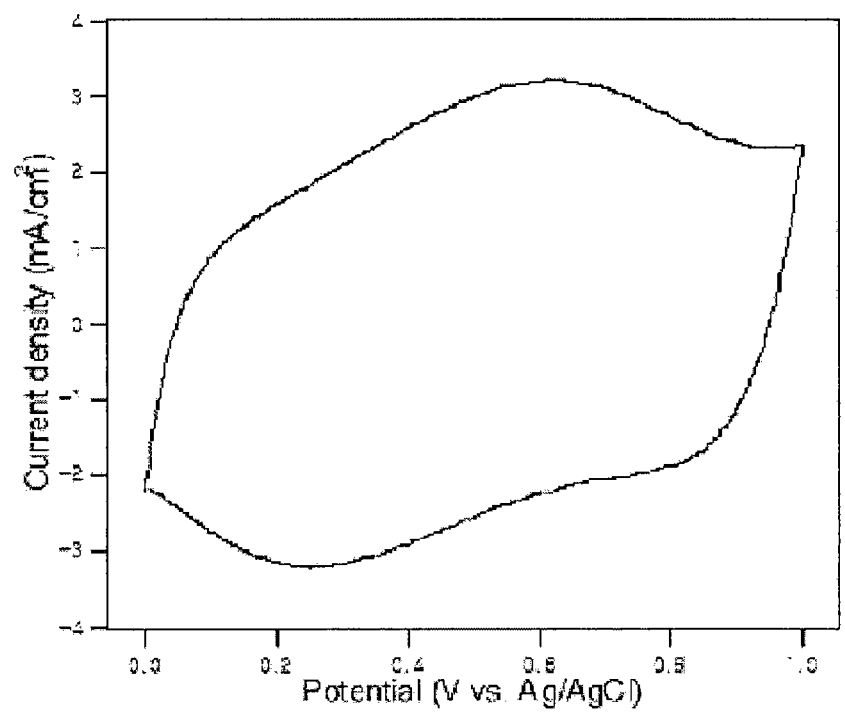
FIG. 9 shows a cyclic voltammetric curve of ruthenium oxide electrode deposited by a cyclic voltammetric method according to a preferred embodiment of the present invention.

FIG. 9 shows a test result obtained by circulating a saturated Ag/AgCl electrode of a period of 0~1V in 0.5 mmol of aqueous solution sulfate with a spinning rate of 10 mV/sec by a cyclic voltammetric method. As shown in FIG. 9, 473 F/g of specific capacitance was obtained.

Preferred Embodiment 3

Figure 10:
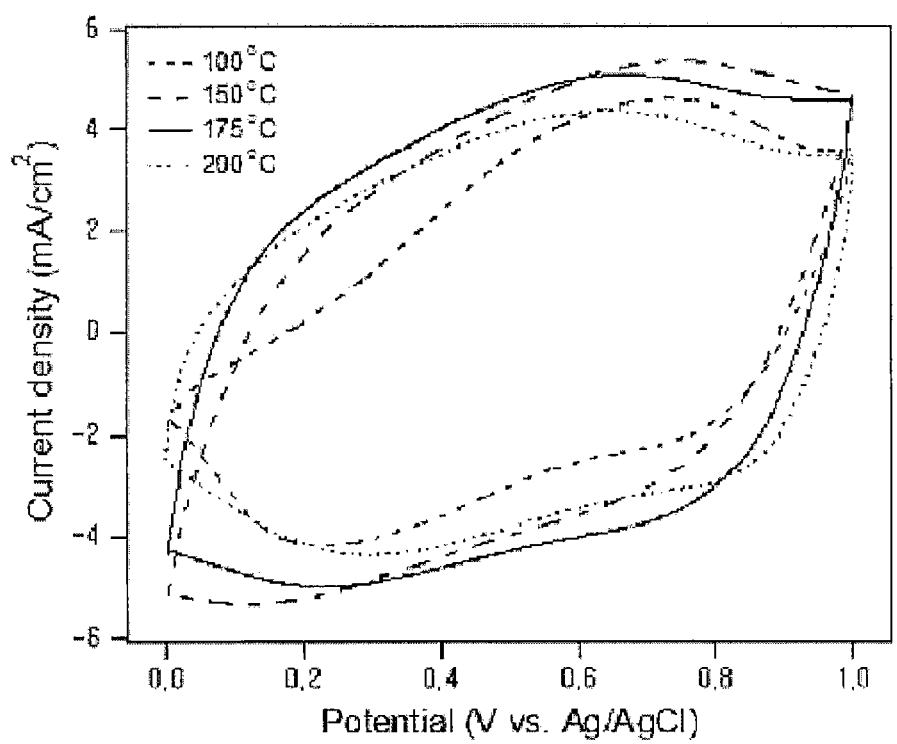
FIG. 10 shows a cyclic voltammetric curve of ruthenium oxide electrode deposited by a cyclic voltammetric method and then heat-treated at different temperatures according to a preferred embodiment of the present invention.

FIG. 10 shows a graph showing a cyclic voltammetric of an electrode heat treated according to each temperature. An electrode that has been deposited 50 times with a scanning rate of 50 mA/sec by a scanning potential current method was used. The specific capacitance was the greatest at a temperature of 175° C. as 594 F/g but was decreased at a temperature of 200° C. The reason is that a proton conductivity is decreased even if an electric conductivity is increased when a thermal processing temperature is increased.

Preferred Embodiment 4

The same process as the aforementioned embodiment 1 was performed except that a substrate obtained as a precursor solution of high polymer-titanium oxide containing CNT particles that are electrospinned was used as a substrate.

0.1 g of multi-walled CNT particles was placed into 15 ml of DMF, and then was dispersed by ultrasonic wave. Then, 3.0 g of titanium propoxide and 1.0 g of acetic acid were added to the solution, and an electrospinning operation was performed, thereby preparing a substrate. Ruthenium oxide was deposited on the substrate in the same manner as the aforementioned preferred embodiment 2, and then a thermal processing was performed for 30 minutes at a temperature of 175° C. Then, a potential period of 0~1V (saturated Ag/AgCl electrode) was tested in 0.5 mmol of aqueous solution sulfate with a spinning rate of 10 mV/sec by a cyclic voltammetric method. As the result, 461 F/g of a specific capacitance was obtained.

Preferred Embodiment 5

Figure 11:
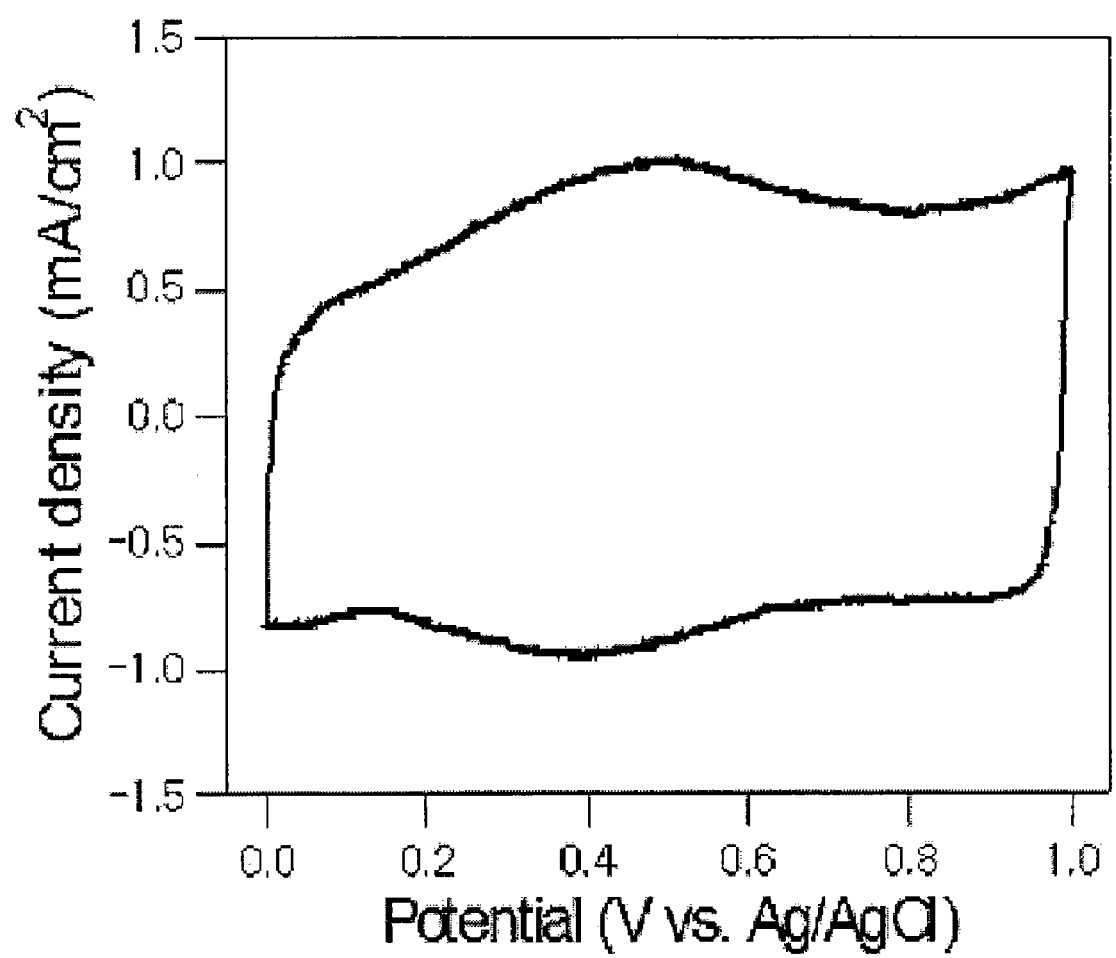
FIG. 11 is a test result showing current density by a scanning rate of 10 mV/sec in a potential range of 0~1V (saturated Ag/AgCl electrode) by a cyclic voltammetric method according to a preferred embodiment 5 of the present invention.

The same process described in preferred embodiment 1 was performed except for using a substrate obtained as a precursor solution of high polymer-titanium oxide containing electrospinned super-P particles. A potential period of 0~1V (saturated Ag/AgCl electrode) was tested in 0.5 mmol of aqueous solution sulfate with a spinning rate of 10 mV/sec by a cyclic voltammetric method. As shown in FIG. 11, 462 F/g of a specific capacitance was obtained. FIG. 5 shows specific capacitance measured according to each scanning rate.

The effects of the present invention will be explained. According to the electrode for a supercapacitor of the present invention, a metal oxide is uniformly deposited on a substrate having a wide specific surface area to effectively utilize the metal oxide. Furthermore, since an active material of the metal oxide is formed on the surface of the ultrafine titanium oxide fiber as a thin film, a bonding material and a conductive particle are not required. Accordingly, a resistance of the electrode is prevented from being increased, and thus, the capacitance of the electrode is prevented from being decreased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A metal oxide electrode for a supercapacitor, comprising:
    an ultrafine titanium oxide fiber layer formed on a current collector;
    and
    a metal oxide layer formed on the titanium oxide fiber layer.

2. The electrode of claim 1, wherein the ultrafine titanium oxide fiber layer contains conductive particles.

3. The electrode of claim 1, wherein the ultrafine titanium oxide fiber layer has a diameter of 50 nm~1000 nm.

4. The electrode of claim 1, wherein the ultrafine titanium oxide fiber layer has a diameter of 1 nm~50 nm and a length of 10 nm~200 nm.

5. The electrode of claim 1, wherein the current collector is selected from one of a metal plate, a metal mesh, and a metal foam.

6. The electrode of claim 1, wherein the metal oxide is a metal oxide such as ruthenium oxide, rubidium oxide, iridium oxide, nickel oxide, cobalt oxide, manganese oxide, vanadium oxide, etc., or a mixture thereof.

7. A method for preparing a metal oxide electrode for a supercapacitor, comprising:

forming an ultrafilne titanium oxide fiber layer on a current collector by an electrospinning method; and forming a metal oxide layer on the fiber layer, in which the metal oxide layer is electrochemically formed by a constant current potentiometry or a cyclic voltammetric method.

8. The method of claim 7, wherein the ultrafine titanium oxide fiber layer contains conductive particles, and the conductive particles comprise carbon powder selected from carbon particles having a high conductivity, carbon nano tube (CNT), graphite nano fiber (GNF), and metal power selected from gold, platinum, silver, nickel, aluminum, and copper.

9. A supercapacitor having the metal oxide electrode of claim 1.

* * * * *